United States Patent
Kronenberg et al.

(10) Patent No.: US 8,473,606 B2
(45) Date of Patent: Jun. 25, 2013

(54) NETWORK MONITORING SYSTEM

(75) Inventors: Sandy C. Kronenberg, West Bloomfield, MI (US); Harmon Nine, Dearborn, MI (US); Fredrick Eisley, Auburn Hills, MI (US); Matt Cognata, Pleasant Ridge, MI (US); David Johns, Southfield, MI (US)

(73) Assignee: RPX Corporation, San Francisco, CA (US)

( * ) Notice: Subject to any disclaimer, the term of this patent is extended or adjusted under 35 U.S.C. 154(b) by 324 days.

(21) Appl. No.: 12/344,243

(22) Filed: Dec. 25, 2008

(65) Prior Publication Data
US 2009/0106421 A1  Apr. 23, 2009

Related U.S. Application Data

(60) Division of application No. 10/428,154, filed on May 2, 2003, now Pat. No. 7,490,066, which is a continuation-in-part of application No. 09/416,079, filed on Sep. 23, 1999, now Pat. No. 6,560,611.

(51) Int. Cl.
*G06F 15/173* (2006.01)

(52) U.S. Cl.
USPC .................. 709/224; 709/221; 709/223

(58) Field of Classification Search
USPC ........................................ 709/224
See application file for complete search history.

(56) References Cited

U.S. PATENT DOCUMENTS

| | | | |
|---|---|---|---|
| 6,266,700 B1 * | 7/2001 | Baker et al. | 709/230 |
| 6,658,585 B1 * | 12/2003 | Levi | 714/4.3 |
| 6,665,725 B1 * | 12/2003 | Dietz et al. | 709/230 |
| 7,089,300 B1 * | 8/2006 | Birse et al. | 709/221 |
| 7,580,996 B1 * | 8/2009 | Allan et al. | 709/224 |
| 2002/0161861 A1 * | 10/2002 | Greuel | 709/220 |
| 2003/0097438 A1 * | 5/2003 | Bearden et al. | 709/224 |
| 2003/0131078 A1 * | 7/2003 | Scheer et al. | 709/220 |
| 2003/0200285 A1 * | 10/2003 | Hansen et al. | 709/220 |
| 2004/0059900 A1 * | 3/2004 | Backman et al. | 713/1 |

* cited by examiner

*Primary Examiner* — Christopher Biagini
(74) *Attorney, Agent, or Firm* — Berkeley Law & Technology Group, LLP

(57) ABSTRACT

Methods and systems consistent with the present invention solve the limitations of current monitoring systems by automatically and completely monitoring various networks devices and services. Specifically, a network monitoring system monitors all services and conditions on various networks. Moreover, the network monitoring system may provide an advance warning of potential failures and may diagnose any problems that may surface.

15 Claims, 18 Drawing Sheets

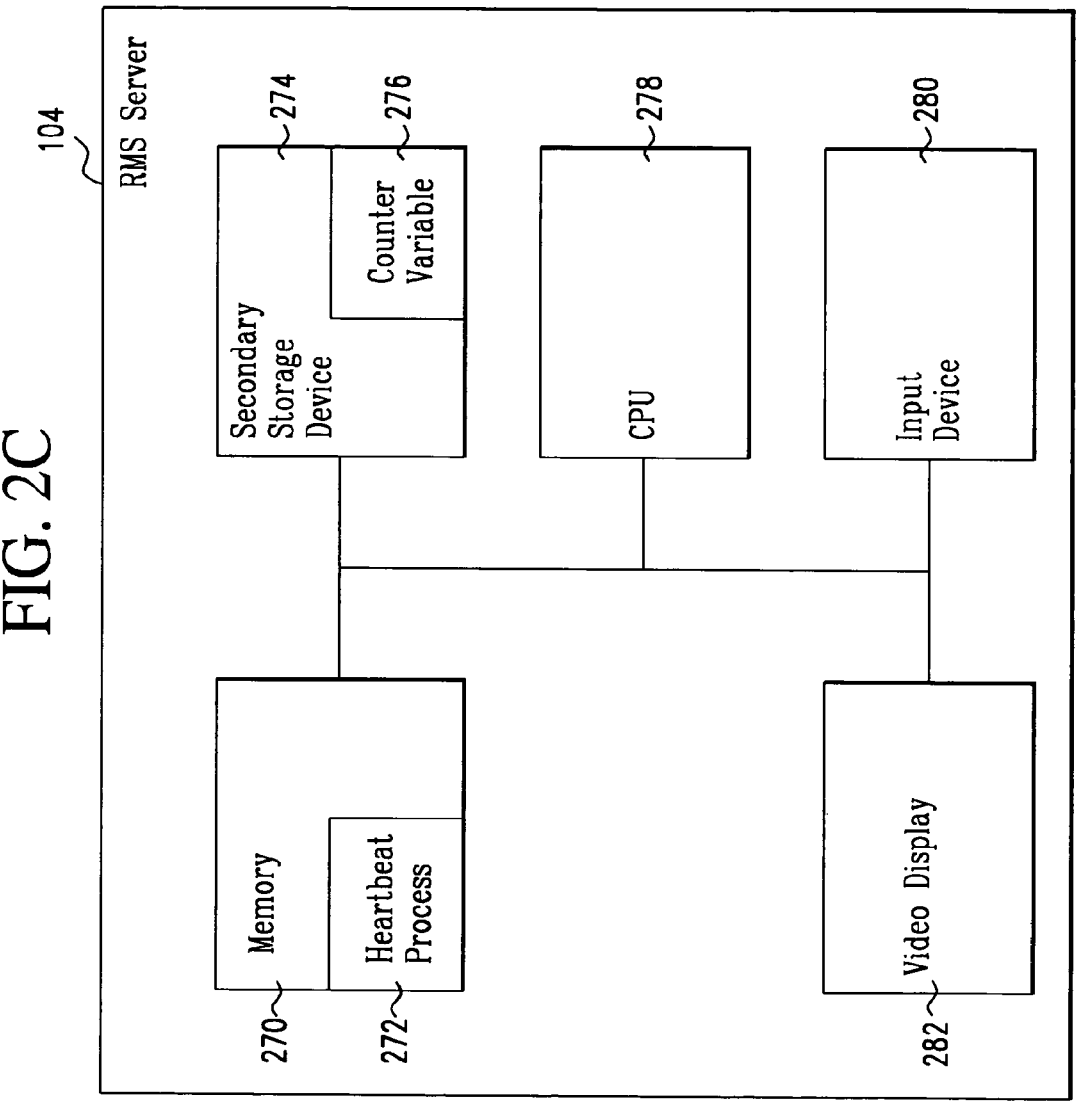

| DATE | TECHNICIAN | TICKET NO. | DIAGNOSIS |
|---|---|---|---|
| 10/1/99 | John | 01101101 | HTTPD SERVICE |
| 10/1/99 | John | 01101111 | ERROR IN SECURITY LOG |
| 10/1/99 | Bob | 01102222 | TEMP TOO HIGH |
| 10/1/99 | Bob | 01102111 | UNUSUAL ICMP TRAFFIC |

NETWORK MONITORING SYSTEM

CROSS-REFERENCE TO RELATED APPLICATIONS

The present invention is a divisional application to U.S. patent application Ser. No. 10/428,154 entitled "Method, Apparatus, and Article Of Manufacture For A Network Monitoring System" filed on May 2, 2003, which is a continuation in part of U.S. patent application Ser. No. 09/416,079 entitled "Method, Apparatus, and Article Of Manufacture For A Network Monitoring System," filed Sep. 23, 1999. The prior applications are incorporated herein in their entirety by reference.

Provisional U.S. Patent Application No. 60/103,973, entitled "Method, Apparatus, and Article Of Manufacture For A Network Monitoring System," filed Oct. 13, 1998 is relied upon and is incorporated by reference in this application.

BACKGROUND OF THE INVENTION

1. Field of the Invention

This invention relates generally to network monitoring systems and, more specifically, a method for monitoring mission critical network infrastructures and providing application support for client networks.

2. Description of the Related Art

As we approach the new millennium, computer networks have migrated from single server systems to mission critical network infrastructures. A mission critical network infrastructure is a network that runs an electronic commerce site or provides real time data to a plurality of users. These network infrastructures generally must remain online at all times and can afford little or no down time. Devices on these networks usually are comprised of many different types and brands of network devices, such as Windows NT servers, Unix servers, routers, and terminal servers. For example, if, per chance, a Unix billing system were to fail, quite possibly, an entire electronic commerce site could lose large sums of money.

What makes maintaining these systems even harder is the fact that the devices on the network are generally proprietary and do not conform to any one standard. For example, to configure a firewall from outside a private network, a non-standard port may be used, such as port 2058. In fact, even devices that use standard ports sometimes use different methods to indicate availability. For example, a router may use well-known Simple Network Management Protocol (SNMP) traps to indicate availability, whereas a well-known telnet server provides a "login" prompt when a client connects to a port 23. Moreover, if a network contains 50 telnet servers, even though they respond the same way, monitoring each one becomes an arduous task.

In addition, displaying all devices on a computer screen located within a large network is difficult since viewing techniques generally present devices within the network as icons of equal size. That is, large networks, if viewed in its entirety on an standard viewing screen, would be so large as to make each icon necessarily very small, so that they do not occlude on another; thus making all icons impossible to view.

Although existing monitoring systems can monitor a particular network device or service, currently there is no way to monitor entire networks efficiently. With large mission critical networks, even if the administrator ultimately locates a problem with a device or service, it may take some time for the administrator to determine the cause of the problem.

It is therefore desirable to improve existing network monitoring systems.

SUMMARY OF THE INVENTION

Methods and systems consistent with the present invention solve the limitations of current monitoring systems by automatically and completely monitoring various network devices and services. Specifically, a network monitoring system monitors all services and conditions on various networks. Moreover, the network monitoring system provides advance warnings of potential failures by examining log files and may diagnose any problems that may surface.

In accordance with methods and systems consistent with the present invention, a method is provided for monitoring a network with at least one service on the network. The method spawns a process for each one of the services to monitor, and monitors a service with the spawned process. When a problem is detected with the service, the method notifies an accounting server.

In accordance with methods and systems consistent with the present invention, a method for initiating a network monitoring system is provided. The method determines whether a network monitoring system requests a new image and if it is determined that the network monitoring system requests a new image, the method transmits an image to a network monitoring device, wherein said image formats the network monitoring device and transmits a new configuration to the network monitoring device. The method also locates devices on a network associated with the network monitoring system, updates a database by including located devices and monitors at least one service associated with the located devices.

In accordance with method and systems consistent with the present invention, a method for monitoring a distributed network monitoring system is provided. The method receives a message from a network monitoring device indicating that said device is functional, increments a counter associated with the device and at predetermined periods, the method decrements the counter. The method also determines if the counter crosses a certain threshold and if it does, the method notifies an accounting server. The method may also determine if a new network monitoring device is available and, if it is determined that a new device is available, the method adds a new counter for the new network monitoring device.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 2C depicts a more detailed diagram of an RMS server depicted in FIG. 1;

FIG. 8A depicts a sample report created by the reporting software in accordance with methods and systems of the present invention;

DETAILED DESCRIPTION

Figure 1:
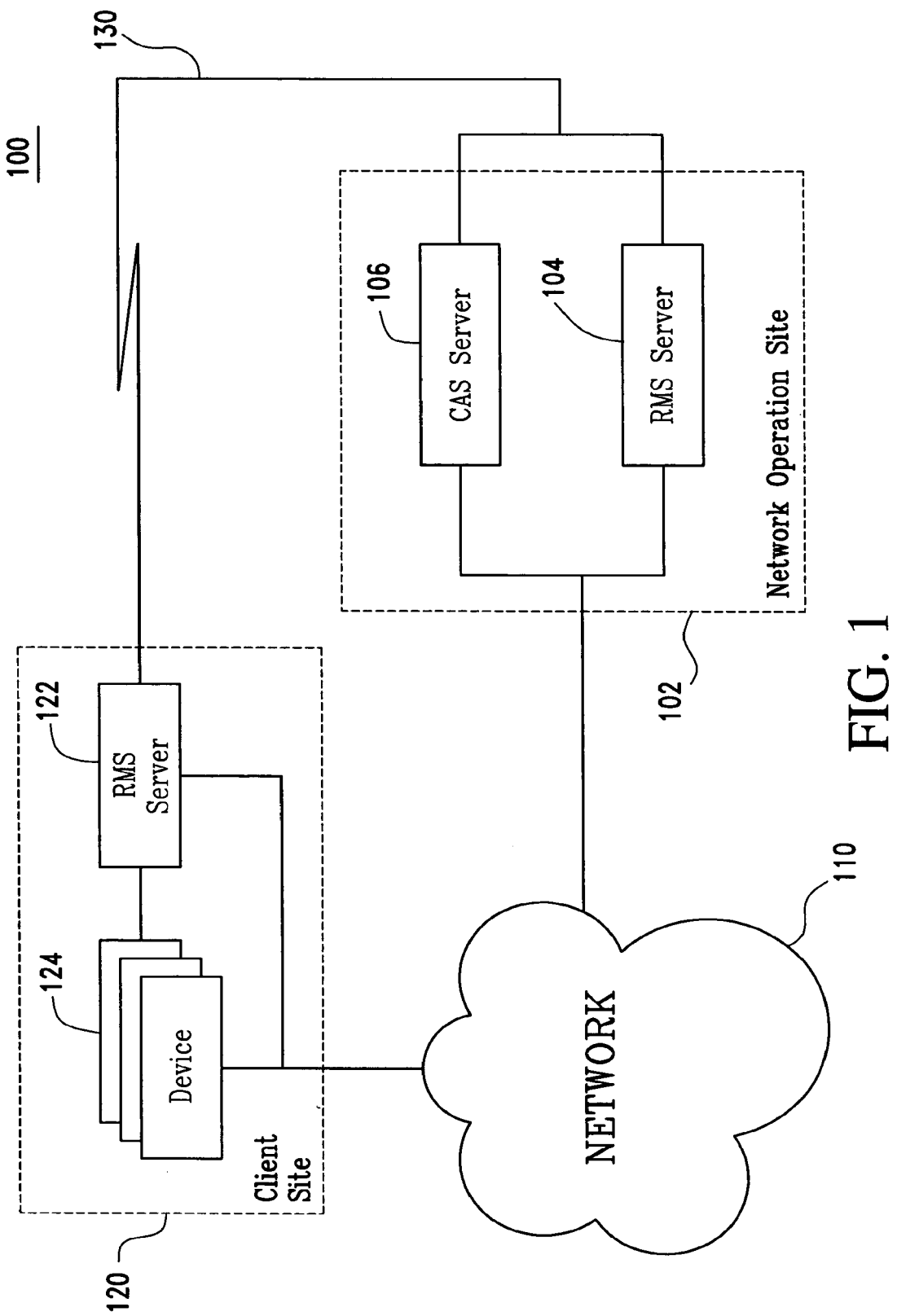
FIG. 1 depicts a data processing system suitable for practicing methods and systems consistent with the present invention.

The following detailed description of the invention refers to the accompanying drawings. Although, the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Introduction

To effectively provide application support, monitor networks, and relay pertinent information regarding various networks to a Network Operation Site (NOS), a Network Monitoring System (NMS) may contain many Remote Monitoring System (RMS) servers and Central Accounting System (CAS) servers, disaster recovery redundant RMS or CAS servers, distributed file systems, agents, databases or user interface servers.

An RMS server is placed at a client site and is responsible for monitoring various network services, such as Hypertext Transport Protocol (HTTP), File Transfer Protocol (FTP), Domain Name Services (DNS), Network News Transport Protocol (NNTP), Simple Mail Transfer Protocol (SMTP), SNMP, environmental conditions, such as power status, temperature, humidity, and security services, such as authentication, intrusion detection, firewalls, encryption, unauthorized devices on the network and network traffic. In addition, the RMS server may also monitor non IP based devices, such as industrial control systems, HVAC systems, legacy PBXs or other miscellaneous communication devices capable of employing serial interfaces (e.g., RS-232).

To monitor a service or condition (e.g., an environmental condition), the RMS server may contain software capable of communicating with a service, sensor, device or agent. The software spawns a copy of itself for each service, sensor, device or agent that the RMS server is configured to monitor. Thus, if five web servers are to be monitored, the RMS server may spawn and maintain five copies of the software. To monitor a security service on a network, the RMS server may examine various log files associated with the device, to send to the CAS server for processing and dispatch. The RMS server may receive a log file by a remote logging program located on the monitored device (e.g., a syslog). To monitor a device, the RMS server may also communicate (e.g., receive updates) with agents associated with such device. An agent may be software residing on a device (local or remote) or an agent may be a dedicated device residing on a network. The agent may communicate with the RMS server using a protocol capable of transmitting messages in real time between two points on the Internet, such as the Jabber protocol.

Each spawned software instance continuously monitors the corresponding service. If the software detects that a service is not responding or that an anomaly has occurred with the service, the RMS server sends information regarding the non-responding service or, in the case of an anomaly, a network traffic report to the NOS as a "ticket." A ticket may be a data record containing information about the service, such as location, severity or the problem, time of occurrence, topology, advice and other information that may assist in determining the problem or anomaly. For example, the ticket may be an SGML document. The ticket is further described below in FIG. 6.

The RMS server may communicate with the NOS through a wired communications link, such as the Internet. However, if the RMS server is unable to contact the NOS through the wired communications link, the RMS server may use an "out-of-band" means, such as a wireless connection (e.g., radio waves) or a direct telephone connection. For fault tolerance purposes, the Network Monitoring System (NMS) may use distributed RMS servers (e.g., RMS servers located on external networks), redundant RMS servers or an RMS server running in a Virtual Machine environment.

When a ticket (message) is sent to the NOS, a CAS server may determine the nature of the problem, and notify the proper personnel. That is, the CAS server may perform an analysis (e.g., using an expert rule database) on the information associated with the ticket and determine the proper means for correction. For example, the CAS server may determine that the ticket information indicates a power failure and a technician may be notified by a page or by an electronic mail message. The CAS server may also store all tickets for later retrieval, such as for creating reports or network visualizations.

To ensure that the RMS servers are operational additional RMS servers may be placed at the NOS to monitor RMS servers at client sites. This RMS server may monitor the connection between each RMS server at client sites and the NOS. If a problem is detected with one of the RMS servers at a client site, as mentioned before, the CAS server may notify the proper personnel. Alternatively, RMS servers may be determined to be operational using a "heartbeat." A heartbeat may be used to determine operational status of the RMS server, data integrity of tickets, availability of central/branch components of the network monitoring system. Heartbeats are further described below.

To store the data necessary for the RMS server and CAS server to perform their respective functions, a uniform standard data format may be employed, such as Standard Generalized Markup Language (SGML) or Extended Markup Language (XML). These languages provide efficient and flexible formats for storing data. In particular, unlike standard databases, these formats may be modified quickly and easily to accommodate system updates and improvements. To process the data, any computer language may be used, such as Practical Extraction and Report Language (PERL). PERL is object-oriented, and provides a module for parsing and accessing SGML or XML data.

System Components

FIG. 1 depicts a data processing system (NMS) 100 suitable for practicing methods and systems consistent with the present invention. Data processing system 100 includes an RMS server 104 and a CAS server 106 located at NOS 102. RMS server 104 may monitor the status of the RMS server at client site 120. CAS server 106 may receive and store tickets and pass the received ticket to diagnose the problem and dispatch personnel if necessary. To diagnose the problem, CAS server 106 may use an expert system.

At client site 120 is an RMS server 122 and various devices 124, such as routers, servers, hubs and serial devices, such as PBXs or HVACs. RMS server 104 and CAS server 106 may communicate with RMS server 122 through network 110, such as the Internet or other out-of-band communications link, such as a telephone line or wireless line. RMS server 122 submits information regarding the status of device 124 to CAS server 106. Although one client site is depicted, one skilled in the art will appreciate that many client sites may exist. Also, one skilled in the art will appreciate that multiple RMS servers may monitor various devices. In case of network 110 failure, RMS server 122 may also communicate with NOS 102 with an out-of-band communication network 130, such as a Plain Old Telephone Service (POTS) line. One skilled in the art will appreciate that CAS server 106 or RMS server 104 may be included at client site 120.

Figure 2A:
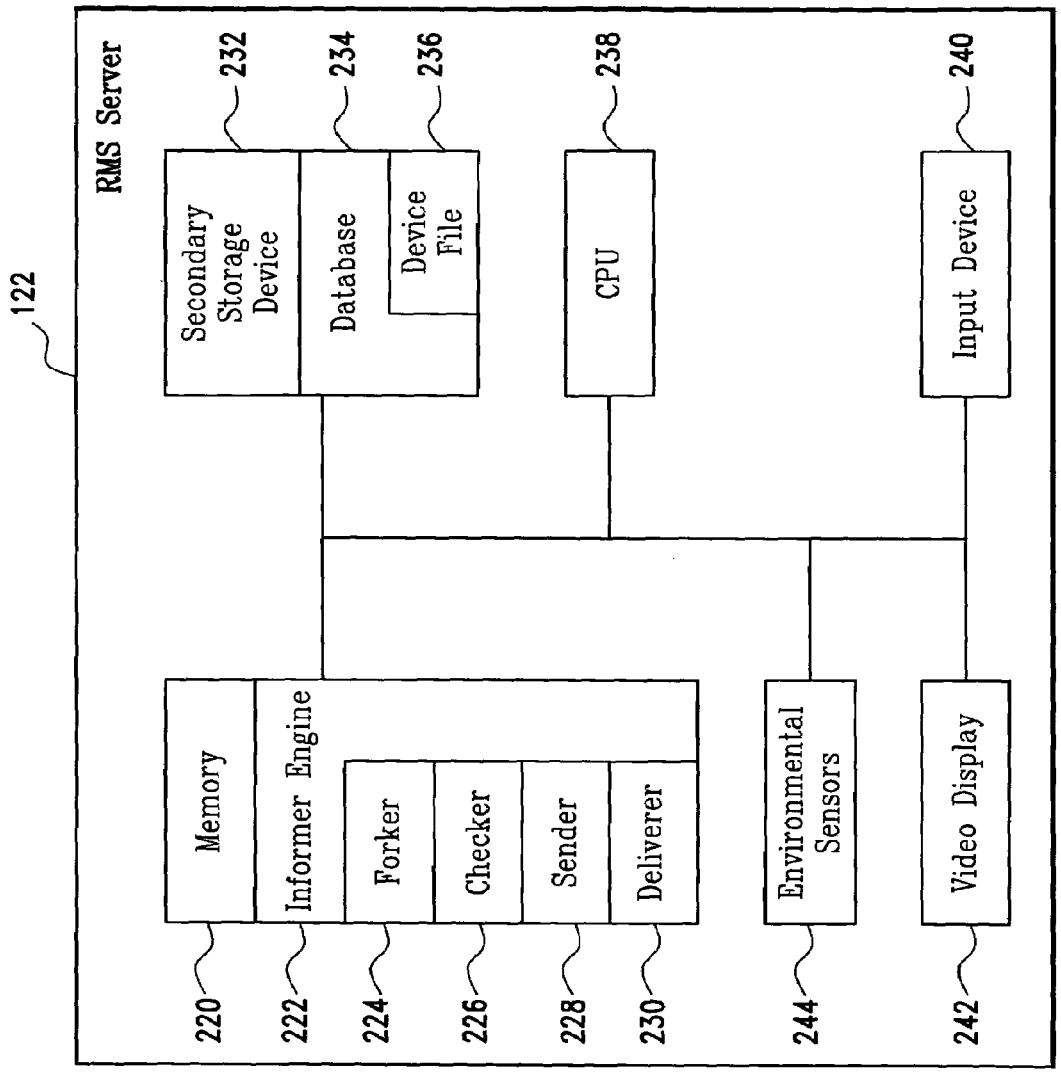
FIG. 2A depicts a more detailed diagram of an RMS server at the client site depicted in FIG. 1.

FIG. 2A depicts a more detailed diagram of RMS server 122. RMS server 122 contains a memory 220, a secondary storage device 232, a Central Processing Unit (CPU) 238, an input device 240, a video display 242, and sensors 244. Memory 220 includes informer engine 222 that responds to information queries from various software associated with informer engine 222. Included in informer engine 222 are forker software 224 that uses well-known Unix fork commands to spawn copies of other software, checker software 226 that monitors devices and communicates with informer engine 222 to receive additional information regarding the device and interfaces with agents located within various devices, sender software 228 that spawns deliverer software 230 when a problem on client network 120 is detected, and deliverer software 230 that transmits a message to CAS server 106 when a problem is detected on client network 120.

Each software communicates with the informer engine 222 though various queries. To do so, the software places the query through an interprocess communication facility such as the well-known Unix types or message queues. The interprocess communication facility allows for efficient communication between active softwares. For example, a query from checker software 226 to informer engine 222 contains information required by the informer engine 222 to fulfill the query. The informer engine 222 responds to the query with the relevant information requested, sending this information to the process that sent the query through the interprocess communication facility. A sensor may be a sensor that monitors the environment, such as a temperature sensor or contact closures on an HVAC system.

Secondary storage device 232 contains a database 234 that interfaces with informer engine 222. Database 234 contains a device file 236 that includes configuration information for RMS server 122 and specific information regarding each service to be monitored at client site 120. For example, device file 236 may contain the IP address of the device 124, the IRQ of environmental sensor 244, or certain errors to locate when parsing log files associated with each service or information associated with the agent.

Figure 2B:
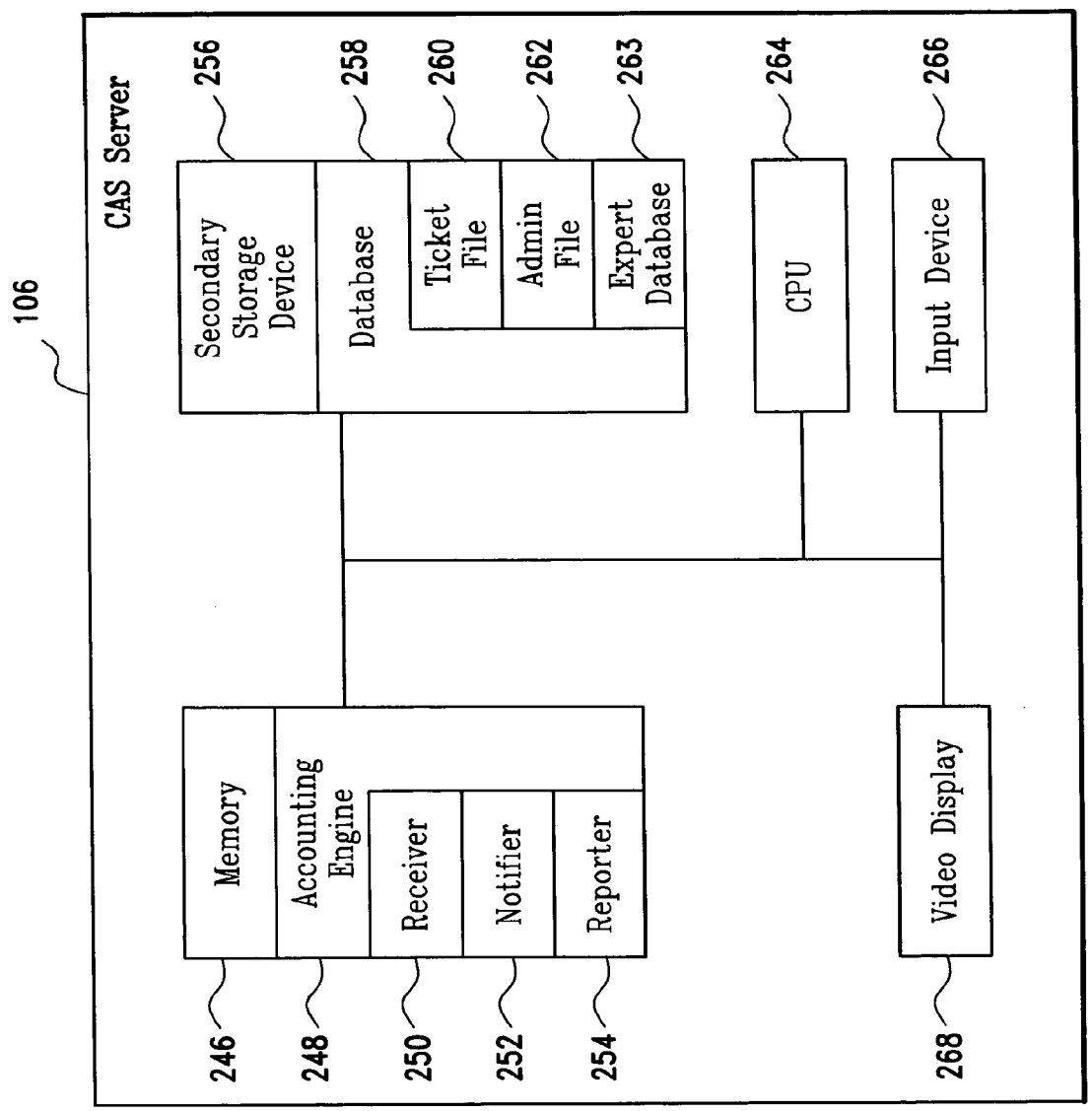
FIG. 2B depicts a more detailed diagram of a CAS server depicted in FIG. 1.

FIG. 2B depicts a more detailed diagram of CAS server 106. CAS server 106 contains a memory 246, a secondary storage device 256, a CPU 264, an input device 266, and a video display 268. Memory 246 includes accounting engine 248 that responds to information queries from various software. Accounting engine 248 includes receiver software 250 that receives tickets from RMS server 122 and places them in CMS database 258, notifier software 252 that analyzes CMS database 258 at regular intervals and, if data indicates a problem it notifies the proper personnel to resolve the problem, and reporter software 254 that generates reports, such as billing information, or the total number of problems recorded by RMS server 122.

Secondary storage device 256 contains a database 258 that interfaces with accounting engine 248. CAS database 258 contains an administrator file 262 that contains information regarding technicians and sales personnel that should be notified when a ticket is received, and a ticket file 260 that contains pending tickets.

Secondary storage device 256 also contains an expert rule database 263. Expert rule database 263 may be used to determine potential courses of actions once tickets are received. Rules in expert rule database 263 may be generated from information manually entered by a technician, such as priority levels for various network failures, network topology, manufacturer specifications (e.g., CPU heat tolerance) or predetermined information based on the device type (e.g., contact HVAC technician if environment is too hot or call webmaster if website pages have been modified without proper authorization).

FIG. 2C depicts a more detailed diagram of RMS server 104. RMS Server 104 may be used to monitor RMS servers 122 (or other devices). RMS server 104 contains a memory 270, a secondary storage device 274, a CPU 276, an input device 280, and a video display 282. Memory 270 includes heartbeat process 272 that decrements counter variables associated with various RMS server 122s. Secondary storage device 274 contains a counter variable 276 for each RMS server 122. Counter variable 276 may be used to store "heartbeats" received from RMS servers 122. Each RMS server 122 may have its own counter variable 276.

Figure 3:
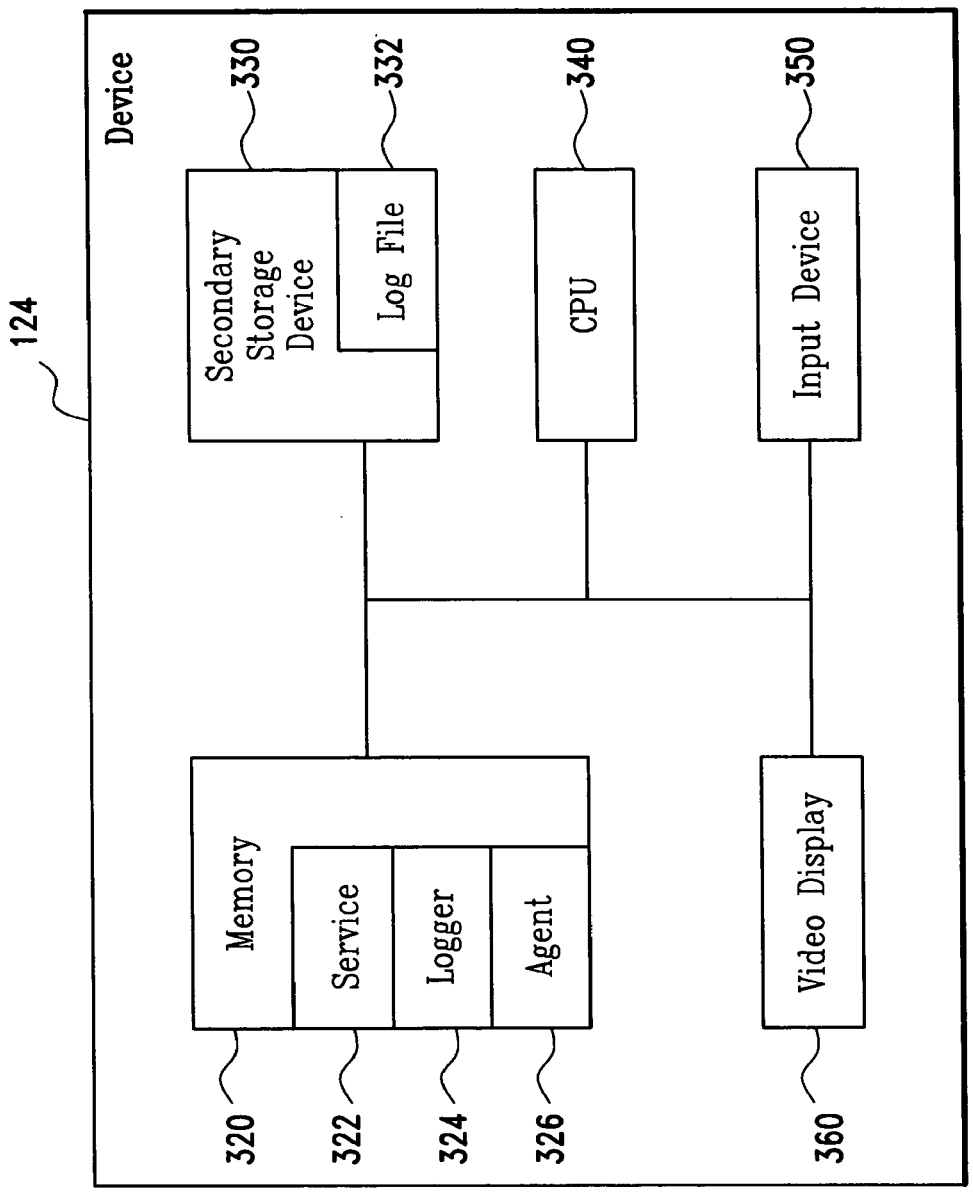
FIG. 3 depicts a more detailed diagram of a device depicted in FIG. 1.

FIG. 3 depicts a more detailed diagram of a device 124. Device 124 contains a memory 320, a secondary storage device 330, a CPU 340, an input device 350, and a video display 360. Memory 320 includes a service 322 that provides access capabilities to device 124. For example, service 322 may be a well-known HTTPD service running on port 80. Service 322 may also be, for example, a routing deamon or SNMP interface. Memory 320 also includes logger program 324 that transmits various log files on device 124 when requested by RMS server 122 or CAS server 106. For example, log file 332 may be a HTTPD access file, or a security access file.

Secondary storage device 330 contains a log file 332 that records various events on device 124. Memory 320 also includes agent 326 that communicates with RMS server. Agent 326 may transmit information to and receive information from RMS server 122. Agent 326 may either review data in a passive gathering mode (e.g., retrieving system logs associated with device 124) or in an active gathering more (e.g., polling processes running on device 124). Agent 326 may gather information, parse the gathered information and transmit the parsed information to RMS 122 server for further processing.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network like the Internet; or other forms of ROM or RAM. Additionally, although specific components and programs of RMS server 122 and CAS server 106 have been described, one skilled in the art will appreciate that these may contain additional or different components or programs.

Overview of the Network Monitoring Process

Figure 4:
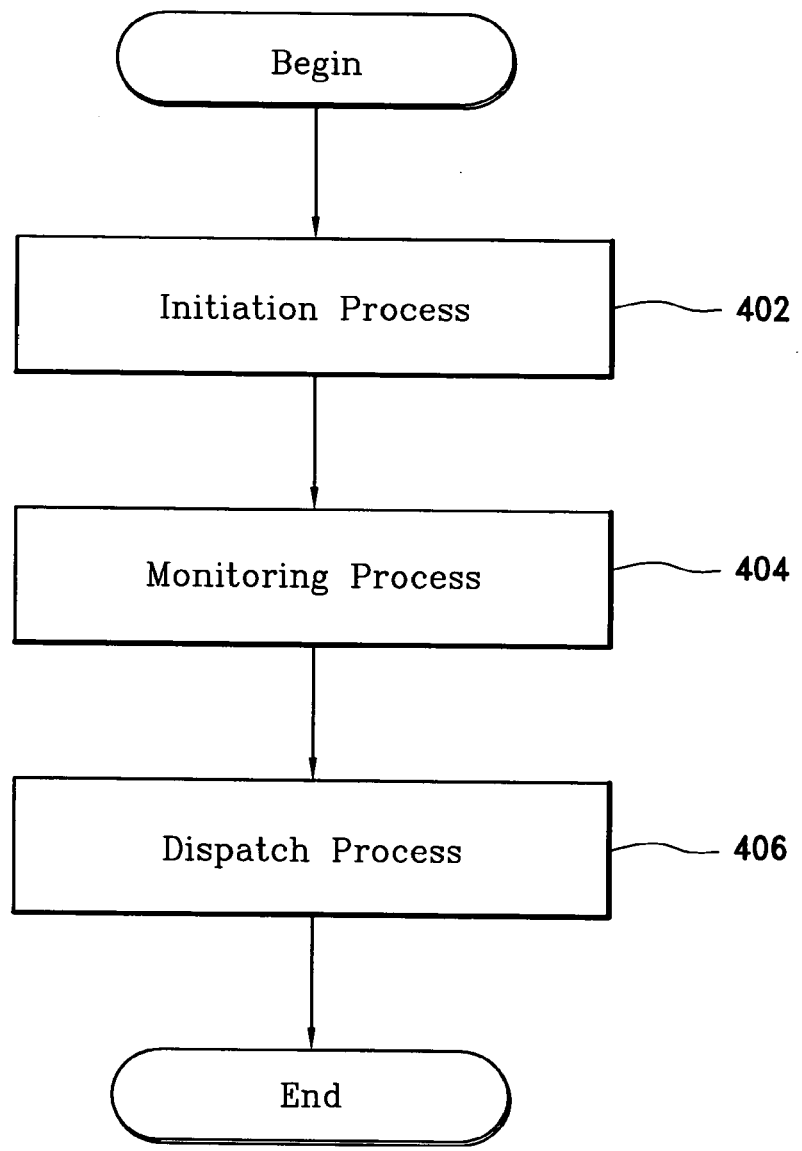
FIG. 4 depicts an overview flow chart of the steps performed by the data processing system of FIG. 1 when monitoring in accordance with methods and systems consistent with the present invention.

FIG. 4 depicts a flow chart of the steps performed by Network Monitoring System 100. The network monitoring process may be initiated by the initiation process (step 402). The initiation process comprises loading of various softwares into the memory of RMS server 122 and CAS server 106. Once the softwares are loaded, the monitoring process may be initiated (step 404). This process entails monitoring various network servers in devices 124, environmental conditions (or other conditions) at the client site and security services with a checker software 226. Step 404 may also include receiving information from agent 326 running on remote devices. During the monitoring process, if a problem is detected with a service (or if information is requested to be transmitted to CAS server 106), checker software 226 notifies NOS 102. Upon a successful notification, NOS 102 determines an appropriate action, and dispatches a message containing possible solutions to the proper personnel (step 406). Network monitoring system 100 provides an automatic monitoring system that requires little or no user intervention to detect and diagnose any problem at client site 120.

Further details and operations of the network monitoring process will now be explained with reference to the flowcharts of FIGS. 5A-5C.

Initiation Process

Figure 5A:
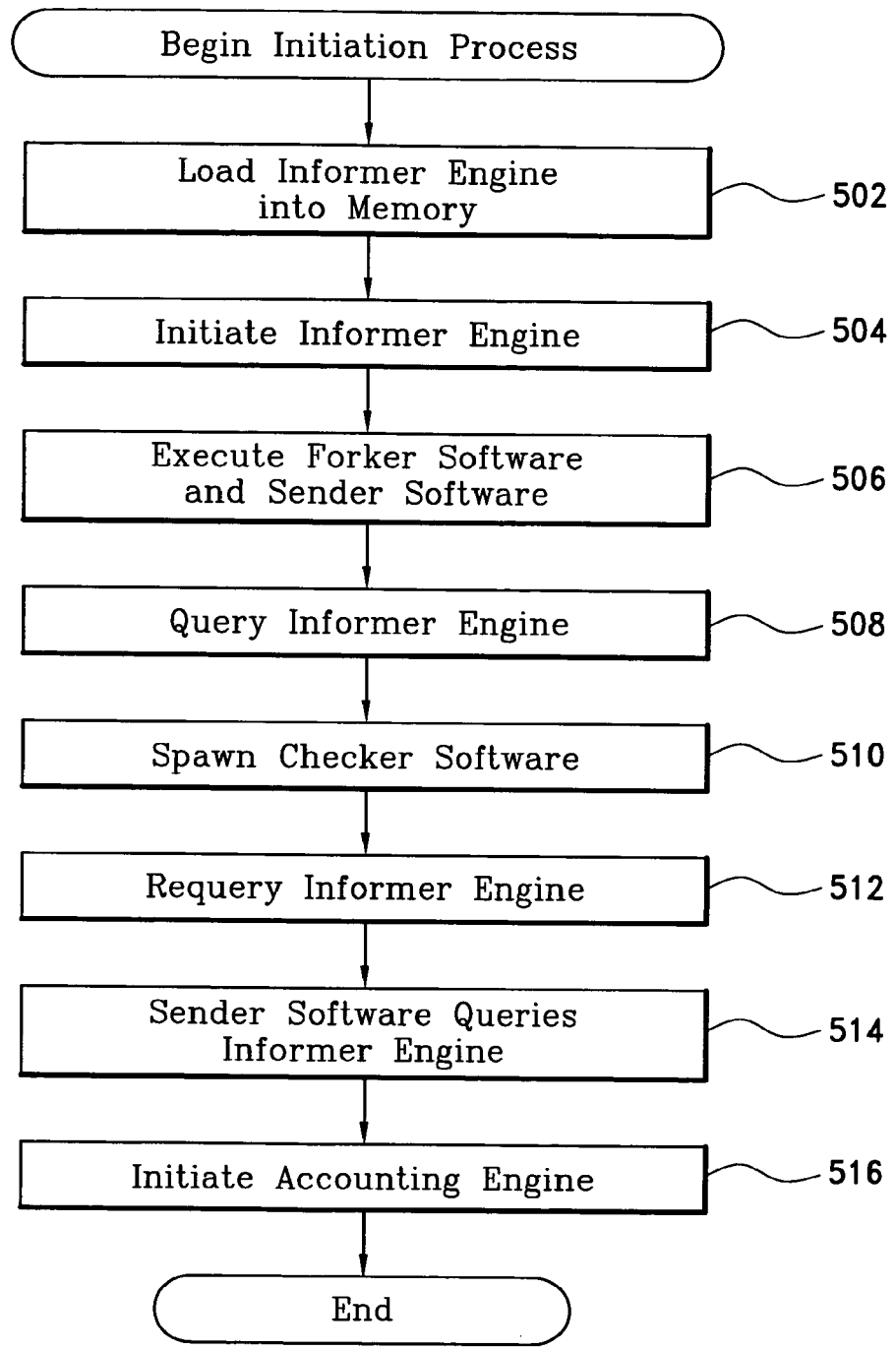
FIG. 5A depicts a flow chart of the steps performed by the initiation process of FIG. 4.

As shown in FIG. 5A, initiation process 402 is initiated, for example, by informer engine 222 being loaded into memory (step 502). For example, informer engine may be loaded from secondary storage device 232 to memory 220. Memory 220 contains enough space for informer engine 222 to execute and load necessary software and files. One skilled in the art will appreciate that informer engine 222 may be loaded by other means, such as by a well-known PCMCIA memory flash card.

Once in memory, informer engine 222 is initiated (step 504) and executes forker software 224 and sender software 228 (step 506). Forker software 224 and sender software 228 remain in memory with informer engine 222. Also, informer engine 222 reads and loads device file 236 from database 234 into memory 220.

Forker software 224 begins execution by transmitting a query to informer engine 222 requesting a list of all services on device 124 to monitor at client site 120 (step 508). Informer engine 222 obtains this information by reading device file 236. Once obtained, informer engine 222 transmits the requested information to forker software 224. For example, if device file 236 contains an entry to monitor web and mail services on device 124, informer engine 222 may transmit responses to forker software 224 that includes the port number of the web and mail services, and the physical address of device 124. Informer engine 222 may transmit the response as follows:

1 Port number: 80 Address: 200.2.8.10 Port number: 25 Address: 200.2.8.10

Once forker software 224 obtains this information from informer engine 222, forker software 224 spawns one checker software 226 for each service 322 to monitor (step 510). Forker software 224 spawns multiple copies of checker software 226 so that RMS server 122 may simultaneously monitor all services, thereby reducing the total time to completely monitor client site 120. For example, referring to the responses mentioned above, forker software 224 spawns two copies of checker software 226 to monitor port 80 and port 25 at address 200.2.8.10. Forker software 224 transmits the address of device 124 and port to the corresponding spawned checker software 226. One skilled in the art will appreciate that other attributes may be used to identify the device and service, such as a protocol address, or machine address. Also, forker software 224 may spawn a checker software 226 to monitor sensors 244 on RMS server 122 and forker software 224 may spawn a checker software to receive information from various agents. One skilled in the art will also appreciate that a checker software may be used to monitor multiple types of various devices.

Each spawned checker software 226 transmits a query, similar to the forker query, to informer engine 222 (step 512). The query is a request for additional details regarding the service to monitor on device 124 or sensor information. The query includes the address and port of the service checker software 226 will be monitoring. In the case of a security service, the query may include information regarding the log file to obtain from device 124. For example, checker software 226 may need to know a list of errors to look for in the log file. For example, checker software 226 may parse the log file for multiple well-known Internet Control Message Protocol (ICMP) packets or invalid routes in a routing log file.

Similar to step 508, informer engine 222 obtains this information (if necessary) from device file 236 and transmits the information to checker software 226. For example, if checker software 226 requests additional information from informer engine 222 regarding web services running on device 200.2.8.10, informer engine 222 may transmit a response to checker software 226 that includes the directory to store tickets, the frequency at which to query each service, the duration of monitoring, and the contact person. Informer engine 222 may transmit the response as follows:

2 Directory:/usr/ticket Frequency: 5 minutes Duration: infinite Contact person: Joe Smith Once all copies of checker software 226 have been initiated, sender software 228 transmits a query to informer engine 222 that includes a request for a list of delivery methods and a corresponding data-key to be used when spawning deliverer software 230 and notifying CAS server 106 from client site 120 (step 514). A data-key is a unique character string, such as "INTERNET" that is unique to a delivery method. Sender software 228 requires a delivery method and a data-key to spawn a new deliverer software 230. Similar to step 508, informer engine 222 responds with the data-keys to be used to send tickets to NOS 102, along with the order in which to try them. Sender software 228 attempts each delivery method using a deliverer software 230 in turn until one method succeeds in sending a ticket to the NOS 102. For example, the first delivery method typically tried by deliverer software 230 is the Internet. However, if the Internet is unavailable, deliverer software 230 may attempt a second delivery method, such as a well-known POTS line. Informer engine 222 may transmit the response as follows to sender software 228:

data-key-order: Internet, POTS, RADIO

Each delivery method is associated with a data-key which provides different information. For example, the Internet-delivery method requires an IP-address and port-number, whereas the POTS delivery method requires a phone-number, login, and password.

Also during initiation, CAS server 106 initiates accounting engine 248. Similar to the initiation of informer engine 222 in RMS server 122, accounting engine 248 executes receiver software 250 and notifier software 252 (step 516). Receiver software 250 then queries accounting engine 248 for the location to place an incoming ticket. Accounting engine 248 reads administrator file 262 from database 258 for this information. Receiver software 250 may also receive information about notifier software 252 and where to notify personnel.

Once RMS server 122 and CAS server 106 are initiated, monitoring process 504 may begin.

Monitoring Process

Figure 5B:
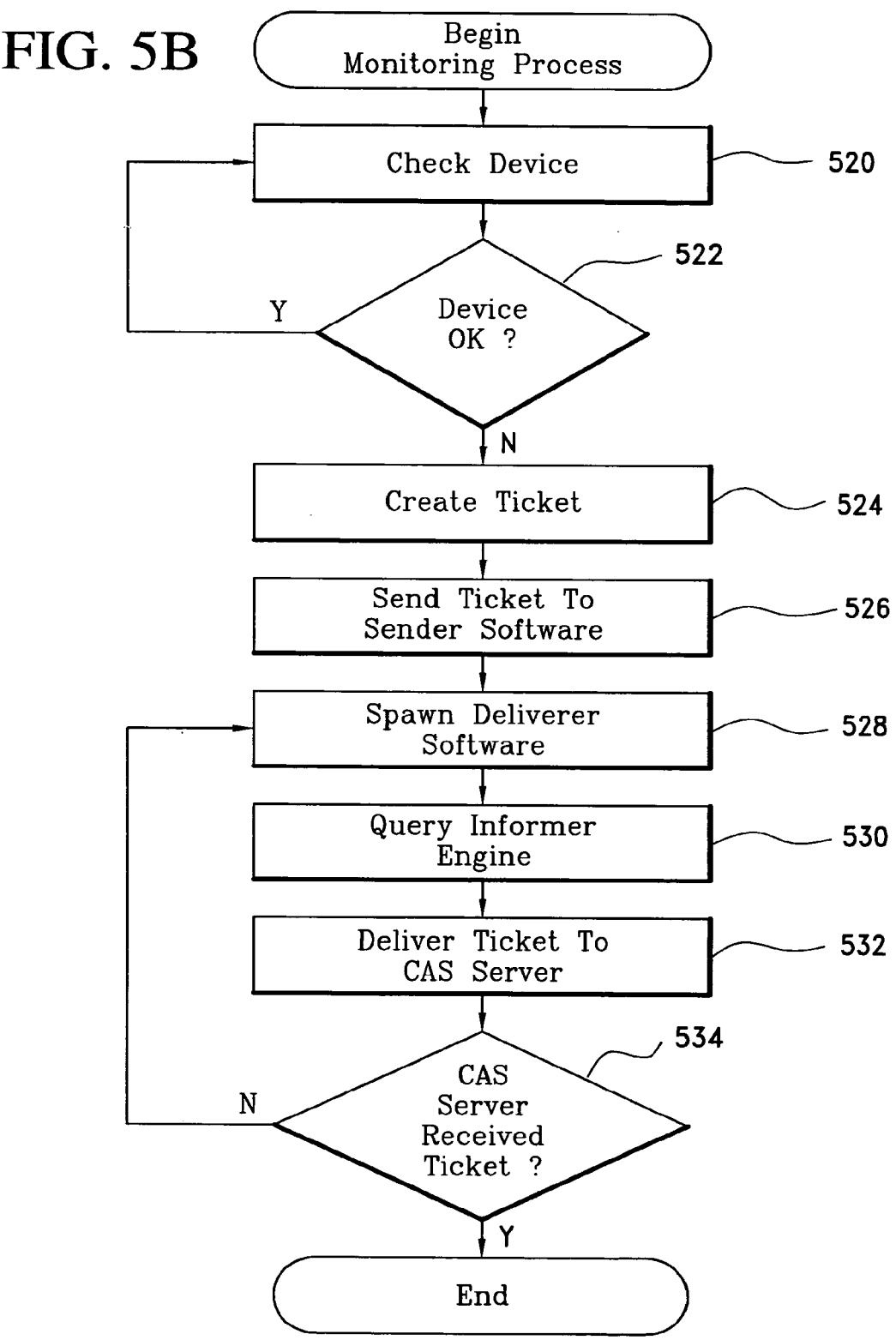
FIG. 5B depicts a flow chart of the steps performed by the monitoring process of FIG. 4.

As shown in FIG. 5B, after the initiation process is completed, the monitoring process begins. To monitor services 322, checker software 226 may perform various techniques. In a first technique, checker software 226 may determine when a service 322 on device 124 does not respond or if an anomaly is present (step 520). For example, checker software 226 may periodically open a web service on device 124. If the web service does not respond within 30 seconds, for example, checker software 226 determines that a problem exists with the web service. Checker software 226 may use any well-known method to check the availability of service 322 on device 124, such as ping, nmap, finger, or telnet. Also for example, checker software 226 may receive a response indicating that an anomaly exists (e.g., contents of web page changed—the RMS unit compared the checksum of a current HTTP get to a previous checksum stored in 236).

In a second technique, checker software 226 may monitor sensors 244. For example, if the temperature is too high, checker software 226 may determine that a problem exists with the environment. This information may be an indication that a problem exists and can be used as an indicator to larger problems.

In a third technique, checker software 226 may obtain log file 332 that corresponds to service 322 on device 124. In doing so, checker software 226 may parse log file 332 and locate a potential problem or anomaly. For example, checker software 226 may receive a log file 332 from a router that indicates that a particular route is not functioning. Although the router is responding, the log file would indicate an error. Regardless of the method used, if checker software 226 detects a problem with service 322 on device 124 or an environmental sensor (step 522), checker software 226 creates a ticket (step 524). Otherwise checker software 226 rechecks the availability of the service again.

Figure 6:
FIG. 6 depicts a ticket in accordance with methods and systems consistent with the present invention.

FIG. 6 depicts an exemplary ticket 600 consistent with methods and systems of the present invention. Ticket 600 may be created using SGML. Ticket 600 contains information that describes the problem with device 124 at a level of detail necessary for a technician to find the problem and correct it or at a level of detail necessary for expert rule database 263 to determine the proper course of action. For example, ticket 600 contains SGML tags 602 to identify a client site, the device location, the device address, and the service name that is malfunctioning. One skilled in the art will appreciate that ticket 600 may contain additional information and also may be written in different formats, such as comma delimited text or database format.

Once ticket 600 is created, checker software 226 transmits ticket 600 embedded in a query to sender software 228 (step 526). Sender software 228 then delivers ticket 600 to CAS server 106. To do so, sender software 228 spawns deliverer software 230 and sends ticket 600 embedded in a query and a data-key to deliverer software 230 (step 528). Deliverer software 230 uses the data-key to query informer engine 222 for information particular to the corresponding delivery method of the ticket (step 530). Once deliverer software 230 receives the delivery method information from informer engine 222, deliverer software 230 sends ticket 600 to CAS server 106 using the corresponding delivery method (step 532). For example, deliverer software 230 at client site 120 may transmit ticket 600 to CAS server 106 over network 110. To do so, deliverer software 230 may connect to the receiver software 250 on CAS server 106 using well-known sockets on the Internet. One skilled in the art will appreciate that deliverer software 230 may transmit ticket 600 to CAS server 106 by other means, such as out-of-band communications, e-mail, FTP or HTTP.

Once transmitted, deliverer software 230 waits for a confirmation from CAS server 106 that the ticket has been received (step 534). CAS server 106 may confirm receipt by transmitting a reply response to the deliverer software 230. However, if confirmation is not received within a predetermined period of time, deliverer software 230 indicates a failed delivery attempt to the sender software 228. In response, sender software 228 spawns a new deliverer software 230 with a different method than used by the previous deliverer software 230. Again, deliverer software 230 waits for a confirmation from CAS server 106 that the ticket has been received (step 534). Steps 528-534 may repeat until a confirmation is received from CAS server 106. If, ultimately, a confirmation is never received, ticket 600 may be stored on secondary storage device 232 until communication with CAS server 106 is re-established. When communications is re-established, deliverer software 230 may attempt to deliver the ticket again.

Once ticket 600 is successfully delivered to CAS server 106, dispatch process 406 may begin.

Dispatch Process

Figure 5C:
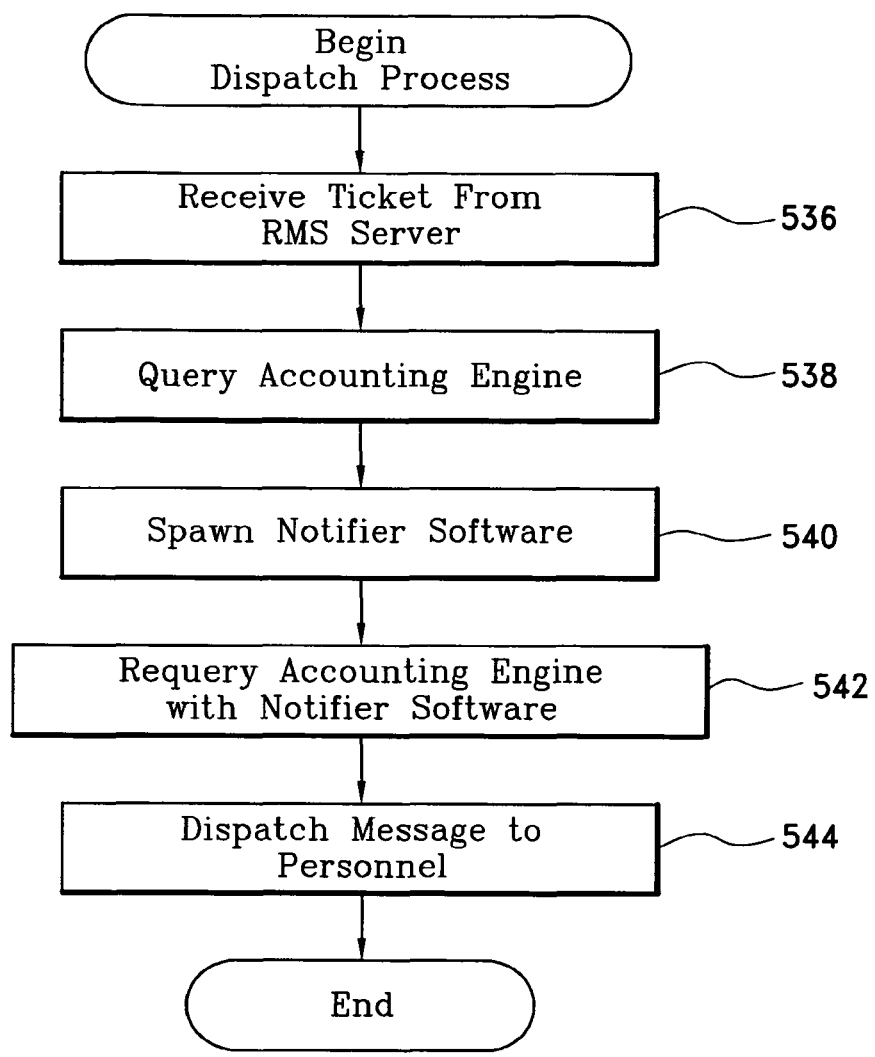
FIG. 5C depicts a flow chart of the steps performed by the dispatch process of FIG. 4.

As shown in FIG. 5C, once the ticket has been received by CAS server 106, the dispatch process begins. The dispatch process begins, for example, by receiving ticket 600 at CAS server 106 from RMS server 122 (step 536). Upon receipt of the ticket, receiver software 250 parses the ticket and uses the information in the ticket to query accounting engine 248 for information on where to place the pending ticket (step 538). For example, receiver software 250 may query accounting engine 248 with the IP address and port number of the service that is nonresponsive.

Additionally, receiver process 250 may query various rules in expert rule database 263. For example, if the ticket includes information indicating the temperature of CPU 340 is 35 degrees, receiver process 250 may request a rule from expert rule database 263 to determine whether CPU 340 is operating within manufacturer specifications. In another example, if the ticket indicates a web page time stamp has changed, receiver process 250 may request a rule from expert rule database 263 to determine whether to contact the webmaster.

Accounting engine 248 may query administrator file 262 for information regarding the service and responds to receiver process 250 with the location for ticket 600 in ticket file 260.

Once the location information is received, receiver software 250 spawns a copy of notifier software 252 (step 540). Notifier software 252 uses the information in the ticket to requery accounting engine 248 (step 542). Accounting engine 248 queries administrator file 262 and expert rule database 263 and responds with the technical or sales personnel to be notified of the pending ticket and the method of notification to use. For example, if notifier software 252 queries accounting engine 248 with the IP and port address of a nonresponsive web service, accounting engine 248 may query administrator file 262 for a notification method. Administrator file 262 may contain a preferred contact method for web services. Accounting engine 248 then responds to notifier software 252 with the notification information.

Once notifier software 252 receives the information from accounting engine 248, notifier software 252 immediately notifies the proper personnel (step 544). For example, if accounting engine 248 informs notifier software 252 that a web Administrator should be notified by e-mail, notifier software 252 transmits an e-mail message to the Web administrator and includes all ticket information.

Logging Feature

In addition to transmitting tickets to CAS server 106, sender software 228 may also obtain log files 332 corresponding to service 322 on device 124. By obtaining log file associated with a particular service 322, CAS server 106 may diagnose the problem with the service.

Figure 7:
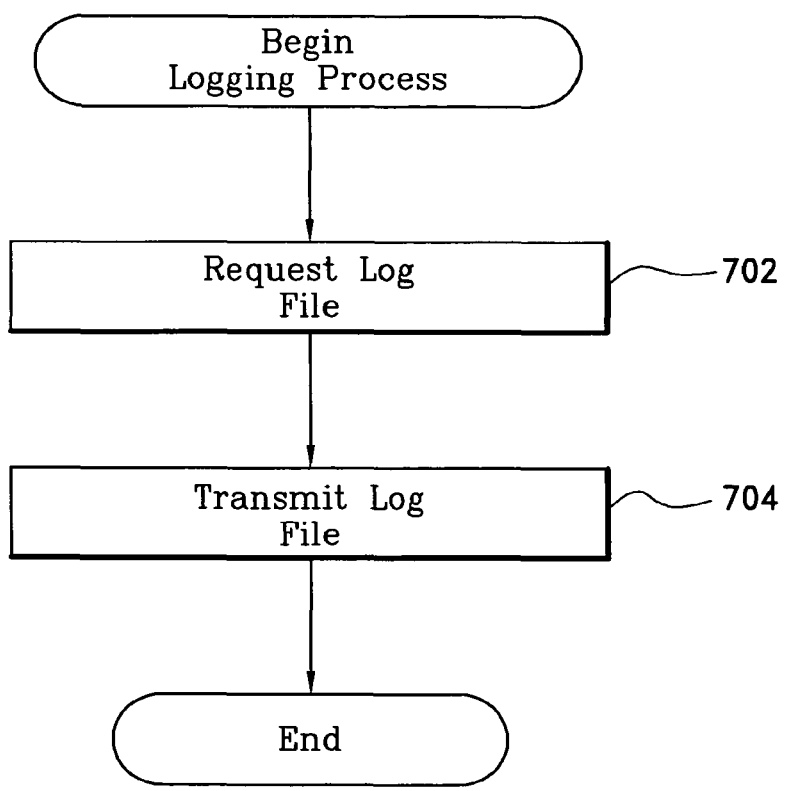
FIG. 7 depicts a flow chart of the steps performed by the logging process in accordance with methods and systems consistent with the present invention.

As shown in FIG. 7, the logging process is initiated by sender software 228 transmitting a message to logger program 324 requesting a particular log file 332 (step 702). For example, if a web service is unavailable on device 124, in addition to transmitting a ticket to CAS server 106, sender software 228 may connect to port 5150 on device 124 and transmit a query to logger program 324 for the HTTP log files. This added feature provides necessary information to help diagnose the problem.

Once the request is received, logger program 324 locates the appropriate log file 332 and transmits a portion of the log file to sender software 228 (step 704). For example, if device 124 is a well-known WINDOWS NT server, logger program 324 may transmit an event file. Once skilled in the art will appreciate that logger program 324 may transmit multiple log files or specific sections of any given log file.

Reporting Features

The reporter software 254 is an additional software used to audit and extract information from ticket file 260 to generate a report. Reporter software 254 analyzes CAS database 258 and generates reports, such as total tickets created, billing information or network visualizations. The reports may help detect patterns experienced by monitored devices.

FIG. 8A depicts a sample report created by reporter software 254 in accordance with methods and systems of the present invention.

These reports may be graphical and may be used to help detect patterns in problems experienced by a device which may in turn lead to the detection of larger scale problems, such as intrusions, security breaches or network traffic anomalies. For example, if a series of tickets indicate that a security log file on a WINDOWS NT server has a flood of ICMP packets, a report may be generated that includes all tickets that indicate the flood problem. One skilled in the art will appreciate that reporter software 254 may access and parse ticket file 260 with well-known programs written in languages such as Structured Query Language (SQL).

Reporter software 254 may also display a visualization of network topology, which may indicate whether the network is affected by failures. Such visualizations may reflect the connectivity of devices on client site 120, as well as display a familiar visualization of the functionality of the devices. Devices may be displayed as "objects" (e.g., icons). The visualization may also be a client site in its entirety, rather than in smaller, selectable segments (e.g., subnets). Thus, presenting to the user a clear perception of the of number of devices (and services on the devices) located at client site 120, and, consequently, the scope of the monitoring being performed. Visualizations of network topology may be creating based on XML schemas representing devices and displayed using scalable vector graphics. A schema is the structure of a database system and is described in a formal language (e.g., XML) supported by the database. The schema may define tables and fields in each table and the relationships between fields and tables. More information on XML schemas may be found at http://www.xml.org which is hereby incorporated by reference. More information on scalable vector graphics may be found at hftp://www.adobe.com/svg which is hereby incorporated by reference. Visualizations of network topologies may be dynamically updated each time a new device 124 is detected or updated in some fashion (e.g., additional ethernet interface added or a new service is detected). That is, by modifying the underlying XML schema, a new visualization will be displayed to the user.

Reporter software 254 enables objects to be large, yet also allow client site 120 to be viewed in its entirety. That is, reporter software 254 presents those objects that are currently of interest as large objects, and the other objects are presented as smaller objects.

Figure 8B:
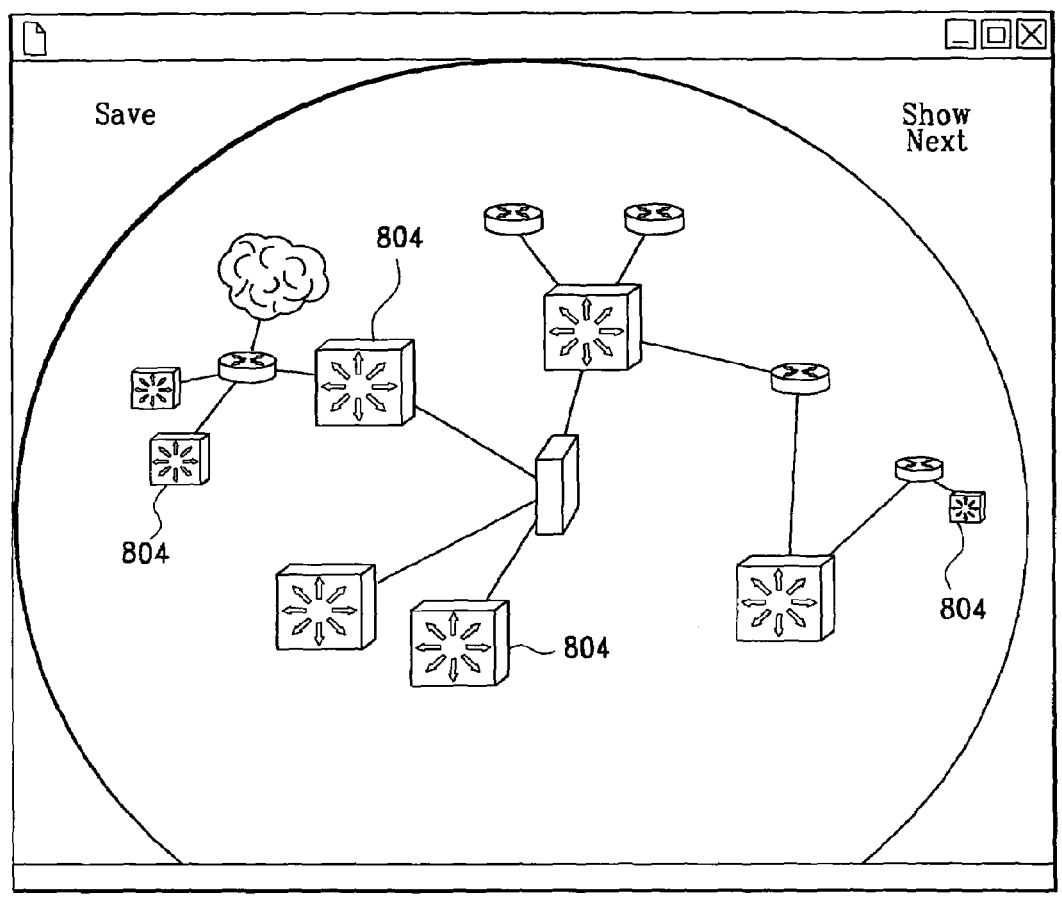
FIG. 8B depicts a sample topology graph created by the reporting software in accordance with methods and systems of the present invention.

FIG. 8B depicts a sample visualization view 802 created by reporter software 254 in accordance with methods and systems of the present invention. Each object 804 may represent a device 124 located within client site 120. Objects in the center of view 802 are larger, and objects near the edge of view 802 are smaller. Thus, to enlarge a set of objects that are of current interest, a user using reporter software 254 may relocate objects (e.g., with a mouse-drag) to the center of view 802. Other objects, while small, are still viewable, and may be enlarged at will as described above. Entire client site 120 and all its connectivity may be displayed within view 802.

Objects 804 in FIG. 8B may be also associated with various colors. Each color may represent a priority level (e.g., red=urgent; yellow=high; green=normal). Reporter software 254 may query database 258 (or database 234) to determine the current "status" of a device 124 represented by an objects. If the status of the device changes, then the color of the object 804 representing the device may change as well. In addition, a user may "click" on an object 804 to obtain its associated device's details (e.g., IP address, name).

If a user selects an object 804 in visualization view 802, reporter software 254 may display other visualization views. For example, if a user selects (e.g., double click) object 804 in view 802, reporter software 254 may display a second visualization view (not shown) of the LAN segment associated with object 804, network events or details of the selected object.

Also for example, if a ticket for a device associated with object 804 exists, as indicated by a "red" or "yellow" object color, a user may select the object and, in a separate window, a new view (also not shown) may be displayed. The new view may display details associated with the ticket. If no ticket exists, then in the separate view, a configuration page for the device associated with the selected object may be displayed. If a connection between devices (e.g., a subnet connection between two routers) is colored "red" or "yellow", then another device located within the connection has an associated ticket. For example, if the connection between two routers is colored red, then a device located between the two routers may have an associated ticket.

Agent Process

In an alternate embodiment, agent 326 may monitor device 124 instead of checker software 226 monitoring the device. In this embodiment, checker software 226 communicates with agent 326 and receives information associated with the "health" of device 124. Agent 326 may be used to monitor servers, IP capable devices and serial devices, such as legacy PBXs, HVAC systems and relays and contact closures. Agent 326 may utilize serial communications (e.g., RS-232 communications) to translate information associated with the serial devices in realtime. For example, an agent may be a CPU monitor program running on a WINDOWS NT server and a checker software may communicate with agent 326 to retrieve health information of the NT server.

RMS server 122 may communicate with agent 326 by sending commands to a checker software 226 that communicates with agent 326. RMS server 122 may communicate with checker software 226 (which in turn communicates with agent 326) by using a protocol capable of transmitting messages and XML requests. For example, checker software 226 may transmit commands to start and/or stop agent 326. Also for example, checker software 226 may transmit information to agent 326 to update the agent, modify the agent's behavior or delete the agent.

Figure 9:
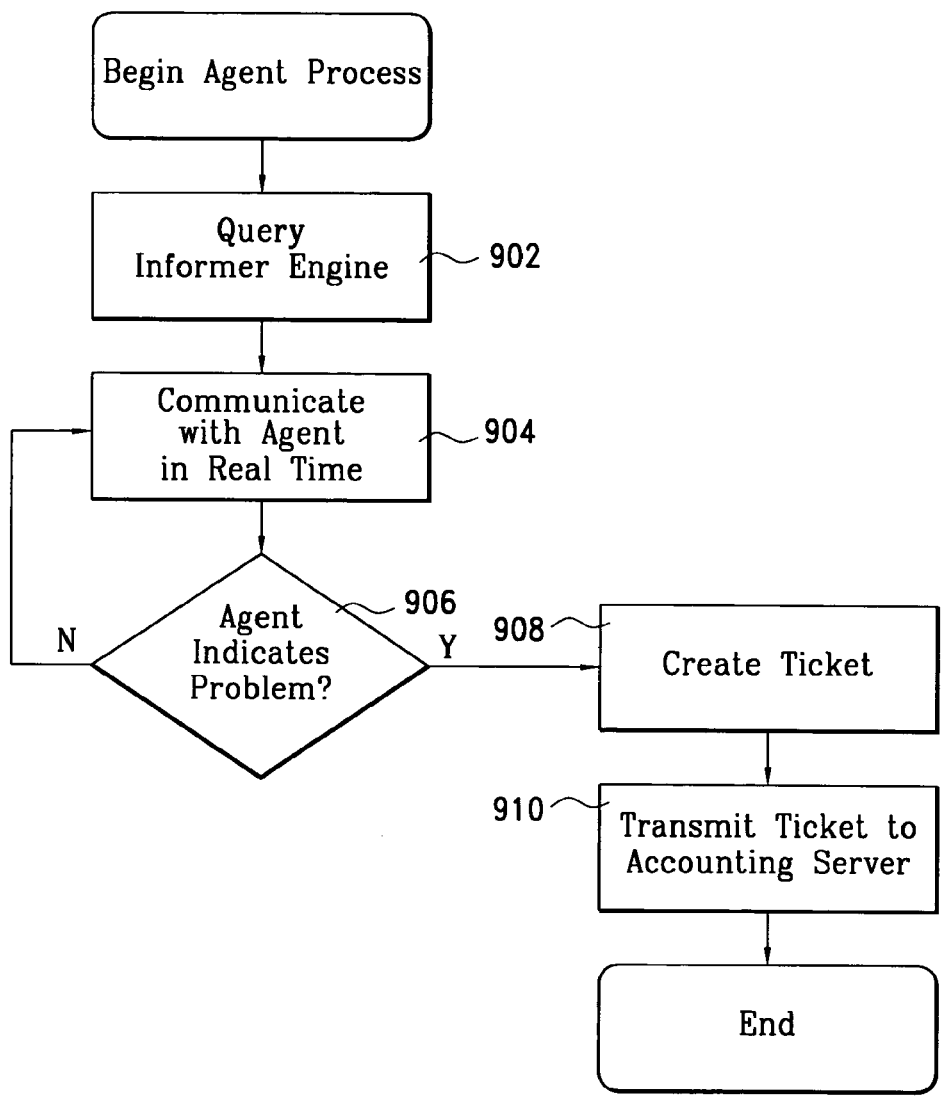
FIG. 9 depicts a flow chart of the steps performed by the data processing system of FIG. 1 when communicating with agents in accordance with methods and systems consistent with the present invention.

As shown in FIG. 9, once checker software 226 is spawned, checker software 226 may query informer engine 222 (step 902). Checker software 226 obtains information from database 234 to locate agent 326. For example, checker software. 226 may locate agent 326 by retrieving an IP address associated with agent 236.

Next, agent 326 and checker software 226 may communicate with each other using a protocol capable of transmitting messages in real time (step 904). For example, agent 326 may transmit information associated with health statistics of device 124 to checker software 226. If agent transmits abnormal statistics from a device 124, checker software 226 may create a ticket since a problem or an anomaly may exist with the device (e.g., operating outside specific temperature) (step 906). For example, device 124 may be a WINDOWS NT server and agent 326 may obtain health information associated with the server. The health information may indicate that CPU 340 is overloaded.

Finally, checker software 226 may transmit the ticket to CAS server 106 as above in FIGS. 5B and 5C (step 908).

Generic Checker

In an alternate embodiment, checker software 226 may be a "generic checker" capable of communicating with various sensors and devices. Generic checker (not shown) may be a single process or a combination of processes and may be configured by configuration files that are dynamically created. Generic checker may interpret configuration files stored in database 234 and/or database 258. Configuration files are written in a language that describes the hypothetical states of elements to be monitored and the various values necessary to reach the different states. Configuration files may also refer to other checker software and may alter the behavior of other checker software or processes to provide complex monitoring, automatic reaction and notification behaviors.

Figure 10:
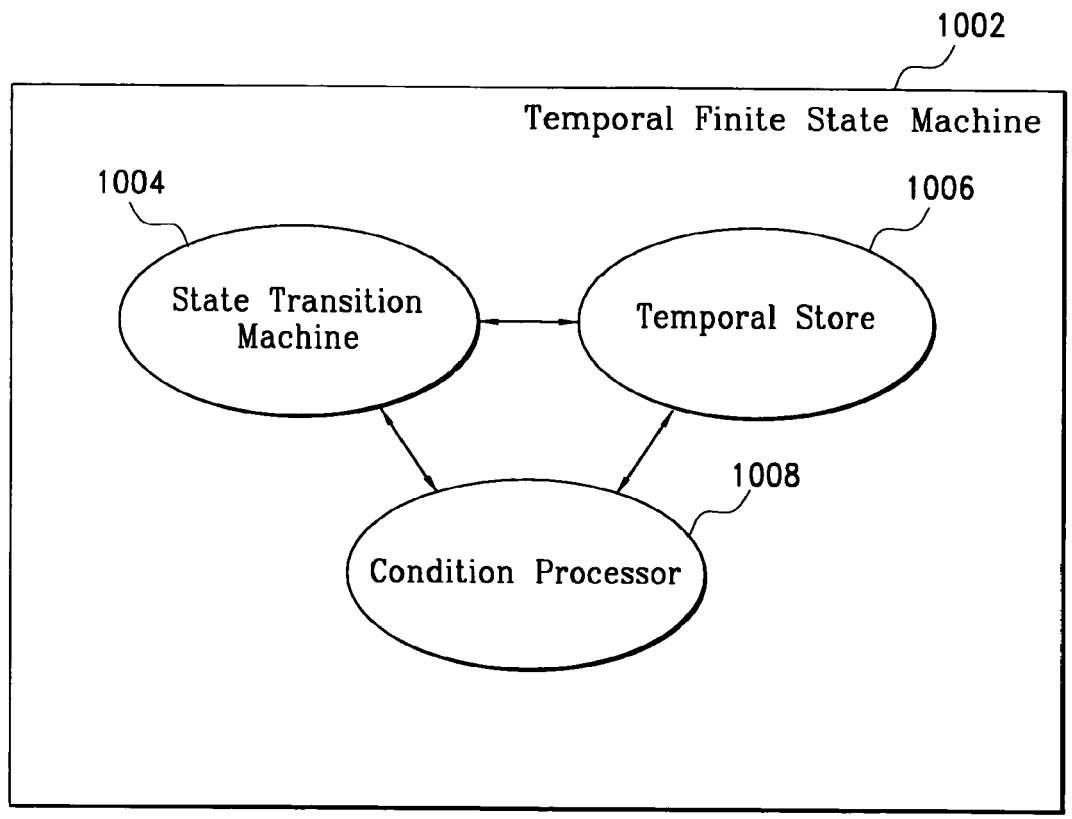
FIG. 10 depicts an exemplary generic checker used for monitoring in accordance with methods and systems of the present invention.

FIG. 10 depicts an exemplary generic checker used for monitoring in accordance with methods and systems of the present invention. Generic checker 1000 may be defined as temporal finite state machine (TFSM) 1002, which includes a state-transition model (STM) 1004, a temporal store (TStore) 1006 and a condition processor (CondProc) 1008.

STM 1004 may consist of an ordered set of hypothetical states. The initial hypothetical state assumes a particular status of a service to be monitored and determines if the status changes. For example, the monitored service may be a telnet service and the initial status may be "port closed." If a connection is made to the monitored service then the hypothesis is deemed false (since the port is open) therefore an alternate hypothesis is assumed (which is the next hypothetical state in the ordered set). If the hypothesis is not false then database 258 is updated since generic checker 1000 has detected a problem and/or anomaly.

For example, generic checker 1000 may be used to determine whether a device 124 (e.g., a router) has been logged onto and has had its configuration modified. If the configuration was modified, STM 1004 may have an initial hypothetical state of "configuration has been changed." If the hypothesis is proved false then no change has been made, but if the hypothesis is proved not false then the variable information deeming the hypothesis false (e.g., new device configuration) is entered into database 258.

TStore 1006 may be updated each time STM 1004 is activated. TStore 1006 contains the terminal state and any intermediate variables. For a particular monitoring event STM 1004 may be activated several times. The terminal states for these activations are aggregated and stored in database 258.

CondProc 1008 analyzes TStore 1004 and determines whether TFSM 1002 may remain in its current state. If the information collected is sufficient to conclude that TFSM 1002's state has changed, then the current state is changed to a new state. CondProc 1008 may update TFSM 1002's state. In order to do so it may be necessary for TStore 1006 to be further analyzed. If no state's enter rule is satisfied, then the default state is stored in database 258.

For example, to monitor a protocol the protocol describing STM 1002 is modified. Note that the STM itself is not modified, rather the protocol description (STM/PD) is modified. Furthermore STM/PD may modify each other whereby the output of one checker can provide the input to another creating the possibility of complex monitoring, function and notification abilities. This complexity can provide temporal responses, dependency related responses or trigger external processes. Presently, the STM/PD is written is XML (SGML Subset) and must conform to an XML schema.

Generic checker simplifies the assimilation of IP based protocols. That is, instead of spending resources examining the complexities of socket programming a programmer may develop a temporal state-transition model with only the protocol defining specification. The existence of the STM/PD makes it relatively easy to replace and improve the underlying STM engine. It also makes it possible to support higher levels of abstraction where the behavior of the protocols are themselves indicative of higher level services.

Heartbeat Process

The heartbeat monitor may be used to determine operational status of any RMS server. The heartbeat monitor may be an integrated system or a completely separate system (with independent architecture and communications). A heartbeat monitor may be setup in either a hierarchy with the outermost branches (component devices or agents) notifying an upstream device of an abnormal condition or failure. The heartbeat may also be arranged as a fully meshed system whereby communication can be transmitted upstream (to a parent server), downstream (to a child server) or laterally to like devices in order to notify proper personnel or provide negative feedback in order to enact alternative queuing strategies or to route data to or through operational systems. When normal service has been restored, positive feedback can restore normal most efficient communication paths.

Figure 11:
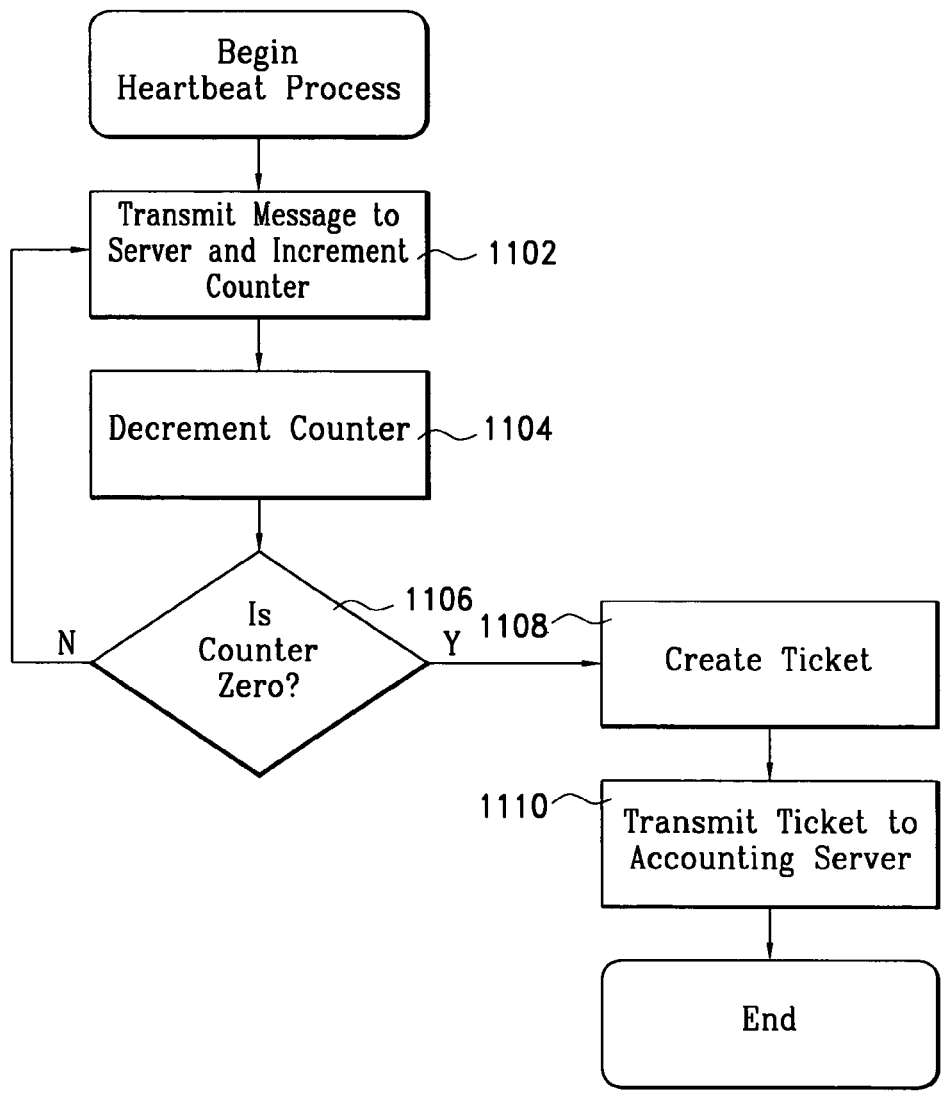
FIG. 11 depicts a flow chart of the steps performed by the data processing system of FIG. 1 when using a heartbeat monitor in accordance with methods and systems consistent with the present invention.

As shown in FIG. 11, heartbeat process in initiated by transmitting a message (e.g., a heartbeat) to RMS server 104 (step 1102). The message indicates that RMS server 122 is functional. Once the message is received, heartbeat process 272 may increment a counter variable 276 associated with the RMS server 122 that transmitted the message received by RMS server 104. Each RMS server 122 has its own counter variable on RMS server 104.

Counter variable 276 may be, for example, a filename in a special directory designed to hold counters. For example, a counter variable may be:

1049316414.300.10.http:%2F %2Fheartbeat.netarx.com %2FHEARTBEAT %2FNET-AMI01%2F10.3.0.203

The filename may consist of 4 fields. A description of these fields follows:

Field 1 (1049316414 in the above example): this is the time (in seconds since the epoch) at which the counter (field 3) will be decremented by the heartbeat process.

Field 2 (300 in the example): this is the time interval (in seconds) between decrements of the counter (field 3) by the heartbeat process.

Field 3 (10 in the example): this is the value of the counter proper (e.g., the value decremented by the heartbeat process and updated by the "heartbeat" of some device or service).

Field 4 (http:%2F %2Fheartbeat.netarx.com %2FHEARTBEAT %2FNETAMI01%2F1-0.3.0.203 in the example): This is a URL that identifies the device or service whose "heartbeat" is supposed to update the counter proper (field 3). In particular, this url is sent as part of any notification the heartbeat-process would make if the counter-proper reaches zero. This URL could be one or more URLs.

One skilled in the art would appreciate that the counter variable may be a file or database and located on a separate server dedicated to monitoring RMS server 122.

Next, heartbeat process 272 may decrement the same counter variable 276 associated with RMS server 122 at regular intervals (step 1104). If RMS server 122 maintains functionality and continuously transmits its message to RMS server 104 (so that counter variable 276 is continuously incremented), counter variable 276 should never reach zero (step 1106). If counter variable 276 reaches zero or crosses some predetermined threshold, through being decrement by heartbeat process 272, this is an indication that RMS server 122, for whatever reason, is unable to transmit a heartbeat (e.g., RMS server 122 is no longer operational). In such cases, heartbeat process 272 may create a ticket (step 1108). Finally, heartbeat process 272 may transmit the ticket to CAS server 106 as above in FIGS. 5B and 5C (step 1110).

The heartbeat monitor may also determine if a new RMS server 122 is available and, if it is determined that a new server is available, the heartbeat process may add a new counter variable for the new RMS server 122. The heartbeat monitor may determine if a new RMS server 122 is available by receiving a message from the new RMS server 122 (e.g., during RMS server initialization).

RMS Initialization

Figure 12:
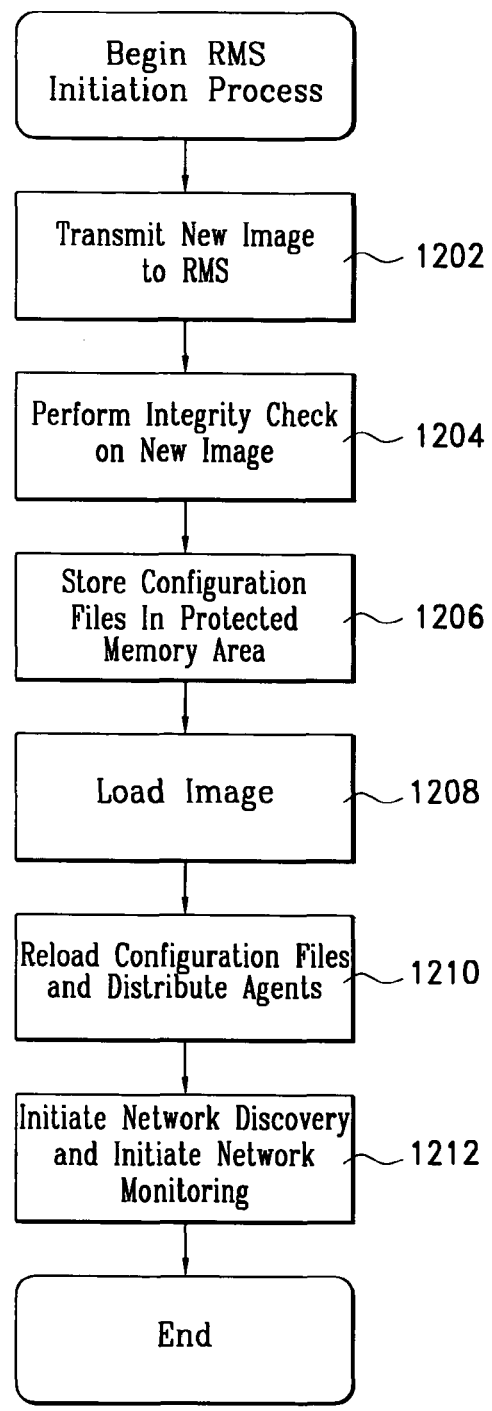
FIG. 12 depicts a flow chart of the steps performed by the data processing system of FIG. 1 when initiating an RMS server in accordance with methods and systems consistent with the present invention.

An RMS server may be initialized automatically (e.g., when a CAS server receives a "setup" message once an RMS server is powered on) or it can be manually initialized (e.g., a user requesting an update to an existing RMS server). As shown in FIG. 12, RMS initialization process in initiated by deploying a new image to an RMS server (step 1202). The new image may be transmitted to RMS sever 122 using a transmission protocol, such as FTP. The image may contain be a compressed operating system capable of replacing the current image and executing on RMS server 122 (e.g., a LINUX kernel). Once RMS server 122 receives the image, RMS server confirms the integrity of the received image (step 1204). For example, RMS server 122 may perform a CRC check on the new image. If the image passes the integrity check, existing device files 236 stored in database 234 may be stored in a protected memory (not shown) of RMS server 122 (step 1206). For example, RMS server 122 may store device files 236 in a protected memory area so that existing device files will be available once the new image is loaded into memory 220 and secondary storage device 232.

As part of the new image deployment, new device files 236 are "pushed" to RMS server 122. For example, device files may be pushed as an XML template (not shown). The XML template may contain a specification describing how services should be monitored and how to generate new device files for RMS server 122. Information that may be included in the pushed XML templates are as follows:

Single socket protocol information (e.g., TCP/IP & UDP/IP)

Simple Network Protocol information:

Collection of arbitrarily derived tables;

Aggregation and summarization of collected information;

Distribution and propagation of aggregated and summarized information;

Detection of condition states via statistical and fractal techniques;

Visualization of conditions using appropriated charts and graphs.

Information extraction using:

Decaying control limits, which ensure regular receipt of messages;

Changes is condition and reestablishment of control limits;

Information that defines services and schedules for service execution (ProcessSchedule);

Information that defines the procedure for determining the instances of a device supporting certain protocols (StateTransition);

Information that defines the method to record observations made by executing the StateTransition process (TemporalMemory); and Information that applies statistical techniques to identify the most statistically probable condition of a monitored service or device (ServiceCondition).

The pushed XML template is a generic template and may be further specified as each device requires. The XML template may embody any or all of the above aspects. One skilled in the art would appreciate that the language, of which a specific XML template is an example, is tailored to the needs and experience of the relevant user designing a device file.

Once the XML template is pushed to RMS 122, the template may then be processed as indicated. In addition the template may be transformed and only have some of its generic elements resolved, thereby, resulting in another a new device file 236.

Once the new image is deployed and new device files are created, RMS server 122 may load the new image into memory 220 (step 1208). If the RMS server 122 loads the new image properly, RMS server 122 may restore the saved configuration files to database 234 (and load new device files) and distribute any new agents received as part of the new image to the appropriate remote machines (step 1210). For example, if an agent to monitor the health of a WINDOWS NT server is included in the new image, RMS server transmits the new agent to the all WINDOWS NT servers.

Once all agents are distributed and all configuration files are reloaded into database 234, RMS server 122 may begin network discovery to locate any new devices to be monitored and RMS server 122 may reinitialize and resume network monitoring (step 1212).

RMS server 122 databases may be dynamically created based on incoming data. For example, a new SNMP OID (and its appropriate bindings and values) can be received that the RMS has not seen before. This information can be utilized by other processes to help modify the currently defined topology and/or it may be aggregated and passed onto a CMS and finally the user interface if requested.

Web Page Interface

Figure 13:
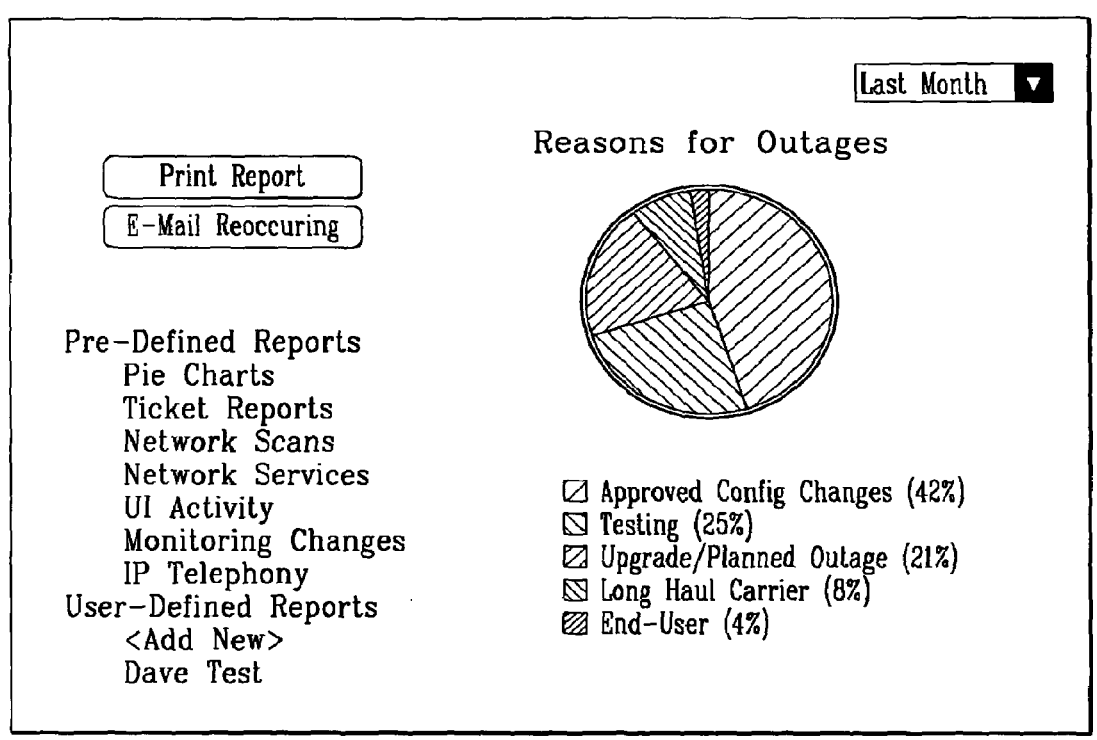
FIG. 13 depicts an exemplary web page interface created by reporting software used in accordance with methods and systems consistent with the present invention.

RMS server 122 may also contain a well-known web interface. The web interface provides the ability to create a manual ticket or a request for service. A user at client site 120 may use a web page on RMS server 122 that can be accessed via any standard browser, such as Netscape Navigator. The web page is written in the well known Hypertext Markup Language, HTML, and can access PERL scripts located on a standard web server, such as the Apache web server. The information needed to be displayed by the Web page is obtained by querying informer engine 222. A ticket submitted by the Web page is similar to a ticket generated by checker software 226. FIG. 13 depicts an exemplary web page interface 1300 created by reporter software 254 in accordance with methods and systems of the present invention.

Conclusion

Methods and systems consistent with the present invention solve the limitations of current monitoring systems by automatically and completely monitoring various networks devices and services. Specifically, a network monitoring system monitors all services and conditions on various network. Moreover, the network monitoring system may provide an advance warning of potential failures and may diagnose any problems that may surface. Methods and systems consistent with the present invention can work well with systems written in C++, Perl, C or other programming languages such as Java.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware or software alone.

What is claimed is:

1. A method for initiating a network monitoring device of a network monitoring system, comprising:
receiving an image and one or more templates at the network monitoring device from a network server entity, the network server entity to transmit the image and the one or more templates at least in part in response to receiving a request to transmit the image, wherein the image comprises an operating system to be executed by a processor of the network monitoring device at least in part to initialize the network monitoring device, and wherein the one or more templates comprise one or more specifications to describe how services are to be monitored for one or more network devices and further to describe how to generate one or more new device files to replace one or more previously existing device files for the network monitoring device, the one or more new device files associated with the one or more network devices;
locating the one or more network devices on a network associated with the network monitoring system;
generating the one or more new device files according to the one or more templates utilizing, at least in part, a processor of the network monitoring device;
loading the image and the one or more new device files into a memory of the network monitoring device utilizing at least in part the processor of the network monitoring device at least in part in response to the one or more new device files being generated; and
monitoring one or more services associated with the one or more located network devices.

2. The method of claim 1, wherein the one or more templates comprise one or more extensible markup language (XML) templates.

3. The method of claim 1, wherein the one or more templates individually comprise an additional specification comprising information indicative of a single socket protocol, wherein the single socket protocol comprises one or more of a transmission control protocol/internet protocol or a user datagram protocol/internet protocol.

4. The method of claim 1, further comprising transmitting the request from the network monitoring device to the network server entity at least in part in response to receiving an input by a user.

5. The method of claim 1, further comprising transmitting the request from the network monitoring device to the network server entity at least in part in response to the network monitoring device powering on.

6. An article, comprising: a non-transitory computer-readable storage medium having stored therein instructions executable by a processor of a network monitoring device to:
receive an image comprising an operating system and one or more templates at the network monitoring device from a network server entity of a network monitoring system, the network server entity to transmit the image and the one or more templates at least in part in response to receiving a request to transmit the image, wherein the one or more templates comprise one or more specifications to describe how services are to be monitored for one or more network devices and further to describe how to generate one or more new device files to replace one or more previously existing device files for the network monitoring device, the one or more new device files associated with the one or more network devices;
initialize the network monitoring device at least in part in response to receiving the image from the network server entity at least in part by locating the one or more network devices on a network associated with the network monitoring system;
generate the one or more new device files according to the one or more templates;
load the image and the one or more new device files into a memory of the network monitoring device at least in part in response to the one or more new device files being generated; and
monitor one or more services associated with the one or more located devices.

7. The article of claim 6, wherein the one or more templates comprise one or more respective extensible markup language (XML) templates.

8. The article of claim 7, wherein the one or more templates individually comprise an additional specification comprising information indicative of a single socket protocol, wherein the single socket protocol comprises one or more of a transmission control protocol/internet protocol or a user datagram protocol/internet protocol.

9. The article of claim 6, wherein one or more templates individually comprise an additional specification comprising information indicative of a network protocol.

10. The article of claim 6, wherein the storage medium has stored thereon further instructions executable by the processor of the network monitoring device to transmit the request at least in part by transmitting a request initiated by a user.

11. The article of claim 6, wherein the storage medium has stored thereon further instructions executable by the processor of the network monitoring device to transmit the request to the network server entity at least in part by transmitting the request in response to the network monitoring device powering on.

12. An apparatus, comprising:
a memory to store an image comprising an operating system and one or more templates received from a network server entity of a network monitoring system, the network server entity to transmit the image and the one or more templates at least in part in response to receiving a request to transmit the image, wherein the one or more templates comprise one or more specifications to describe how services are to be monitored for one or more network devices and further to describe how to generate one or more new device files to replace one or more previously existing device files, the one or more new device files associated with the one or more network devices; and
a processor to perform an initialization operation at least in part in response to receiving the image from the network server entity at least in part by locating the one or more network devices on a network associated with the network monitoring system, the processor further to generate the one or more new device files according to the one or more templates and to load the image and the one or more new device files into the memory at least in part in response to the one or more new device files being generated, the processor further to monitor one or more services associated with the one or more located network devices.

13. The apparatus of claim 12, wherein the one or more templates comprise a respective one or more extensible markup language (XML) templates.

14. The apparatus of claim 12, wherein the one or more templates individually comprise an additional specification comprising information indicative of a single socket protocol, wherein the single socket protocol comprises one or more of a transmission control protocol/internet protocol or a user datagram protocol/internet protocol.

15. The apparatus of claim 12, the processor to initiate transmission of the request from the network monitoring device to the network server entity at least in part in response to receiving an input from a user.

* * * * *